(12) United States Patent
Volcansek

(10) Patent No.: US 11,592,092 B1
(45) Date of Patent: Feb. 28, 2023

(54) TORQUE CONVERTER WITH BALANCED TURBINE THRUST LOADING

(71) Applicant: Schaeffler Technologies AG & Co. KG, Herzogenaurach (DE)

(72) Inventor: John Volcansek, Medina, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/526,043

(22) Filed: Nov. 15, 2021

(51) Int. Cl.
*F16H 45/02* (2006.01)
*F16H 41/24* (2006.01)

(52) U.S. Cl.
CPC ............ *F16H 45/02* (2013.01); *F16H 41/24* (2013.01); *F16H 2045/0252* (2013.01); *F16H 2045/0284* (2013.01)

(58) Field of Classification Search
CPC ..... F16H 2045/0221; F16H 2045/0284; F16H 2045/0252
See application file for complete search history.

(56) References Cited

U.S. PATENT DOCUMENTS

| | | | | |
|---|---|---|---|---|
| 6,782,983 B2* | 8/2004 | Yamamoto | ............ | F16C 19/30 192/3.29 |
| 6,938,743 B2* | 9/2005 | Arhab | .............. | F16H 45/02 192/3.29 |
| 7,708,126 B2* | 5/2010 | Arhab | .............. | F16H 45/02 192/3.3 |
| 7,975,817 B2* | 7/2011 | Mueller | ............. | F16H 57/04 192/55.61 |

* cited by examiner

*Primary Examiner* — Huan Le
(74) *Attorney, Agent, or Firm* — Volpe Koenig

(57) ABSTRACT

A torque converter, including: a cover arranged to receive torque and supported for rotation around an axis of rotation; an impeller; a turbine in fluid communication with the impeller; a stator including a stator blade axially disposed between the turbine and the impeller; a vibration damper including a cover plate, an output flange arranged to non-rotatably connect to an input shaft of a transmission, and a spring engaged with the cover plate and the output flange; a hub non-rotatably connected to the cover; a lock-up clutch including a piston plate; and a first washer directly connected to the output flange, axially disposed between the hub and the output flange, and separated, in an axial direction parallel to the axis of rotation, from the hub by a first gap. A straight line, parallel to the axis of rotation, passes through, in sequence, the output flange, the first washer, and the hub.

20 Claims, 6 Drawing Sheets

TORQUE CONVERTER WITH BALANCED TURBINE THRUST LOADING

TECHNICAL FIELD

The present disclosure relates to a torque converter with balanced turbine thrust loading, which assists closing of a lock-up clutch while enabling slip of the lock-up clutch during a coast condition of the torque converter.

BACKGROUND

Known torque converters overload the lock-up clutch with thrust from the turbine, precluding desired slip of the lock-up clutch during a coast condition.

SUMMARY

According to aspects illustrated herein, there is provided a torque converter, including: a cover arranged to receive torque and supported for rotation around an axis of rotation; an impeller; a turbine in fluid communication with the impeller; a stator including at least one stator blade axially disposed between the turbine and the impeller; a vibration damper including a cover plate, an output flange arranged to non-rotatably connect to an input shaft of a transmission, and a spring engaged with the cover plate and the output flange; a hub non-rotatably connected to the cover; a lock-up clutch including a piston plate; and a first washer directly connected to the output flange, axially disposed between the hub and the output flange, and separated, in an axial direction parallel to the axis of rotation, from the hub by a first gap. A straight line, parallel to the axis of rotation, passes through, in sequence, the output flange, the first washer, and the hub.

According to aspects illustrated herein, there is provided a torque converter, including: a cover arranged to receive torque and supported for rotation around an axis of rotation; an impeller; a turbine in fluid communication with the impeller; a stator including at least one stator blade axially disposed between the turbine and the impeller; a vibration damper including a cover plate, an output flange arranged to non-rotatably connect to an input shaft of a transmission and a spring engaged with the cover plate and the output flange; a hub non-rotatably connected to the cover; a lock-up clutch including a piston plate; and a washer in contact with the piston plate, directly connected to the output flange, axially disposed between the hub and the output flange, and separated from the hub by a gap in an axial direction parallel to the axis of rotation. A straight line, parallel to the axis of rotation, passes through, in sequence, the output flange, the washer, and the hub.

According to aspects illustrated herein, there is provided a torque converter, including: a cover arranged to receive torque and supported for rotation around an axis of rotation; an impeller; a turbine in fluid communication with the impeller; a stator including at least one stator blade axially disposed between the turbine and the impeller; a vibration damper including a cover plate, an output flange arranged to non-rotatably connect to an input shaft of a transmission, and a spring engaged with the cover plate and the output flange; a hub non-rotatably connected to the cover; a lock-up clutch including a piston plate; a first washer directly connected to the output flange, axially disposed between the hub and the output flange, and separated, in an axial direction parallel to the axis of rotation, from the hub by a first gap; a second washer axially disposed between the piston plate and the output flange; and a resilient element directly connect to the second washer and the output flange. A first straight line, parallel to the axis of rotation, passes through, in sequence, the output flange, the first washer, and the hub. A second straight line, parallel to the axis of rotation, passes through, in sequence, the output flange, the resilient element, the second washer, and the piston plate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
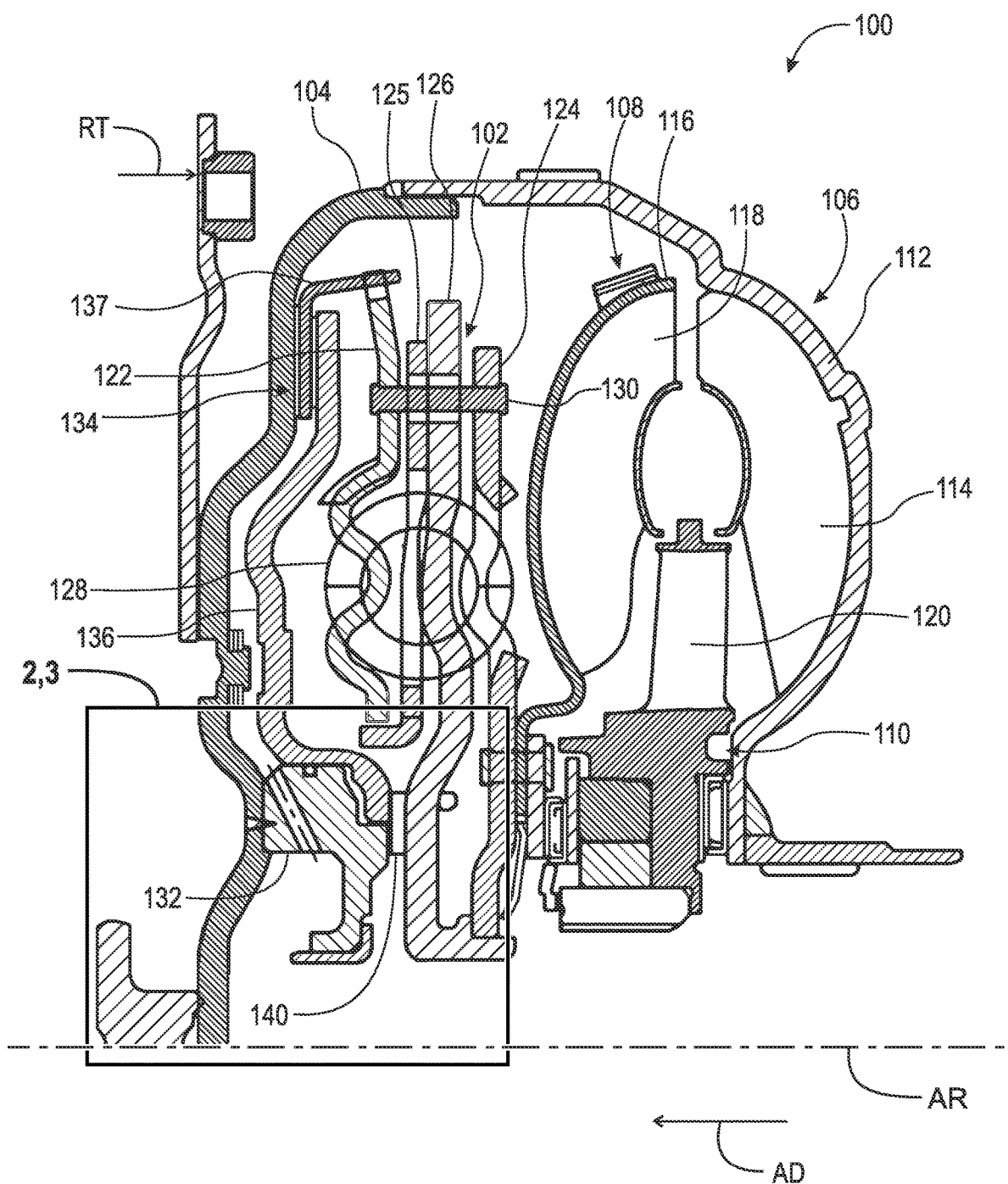
FIG. 1 is a partial cross-sectional view of an example torque converter with balanced turbine thrust loading, in a liftoff mode.

FIG. 1 is a partial cross-sectional view of example torque converter 100 with balanced turbine thrust loading, in a liftoff mode. Torque converter 100 includes: vibration damper 102; cover 104; impeller 106; turbine 108; and stator 110. Impeller 106 includes impeller shell 112 connected to cover 104, and at least one impeller blade 114. Turbine 108 is in fluid communication with impeller 106 and includes turbine shell 116, and at least one turbine blade 118. Stator 110 includes at least one stator blade 120 axially disposed between turbine 108 and impeller 106. Damper 102 includes cover plate 122, cover plate 124, intermediate flange 125, and output flange 126, and spring 128 engaged with cover plate 122, cover plate 124, intermediate flange 125, and output flange 126. Cover plates 122 and 124 are non-rotatably connected by at least one fastener 130. Fastener 130 passes through flanges 125 and 126. Cover plate 124 is non-rotatably connected to turbine shell 116.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 2:
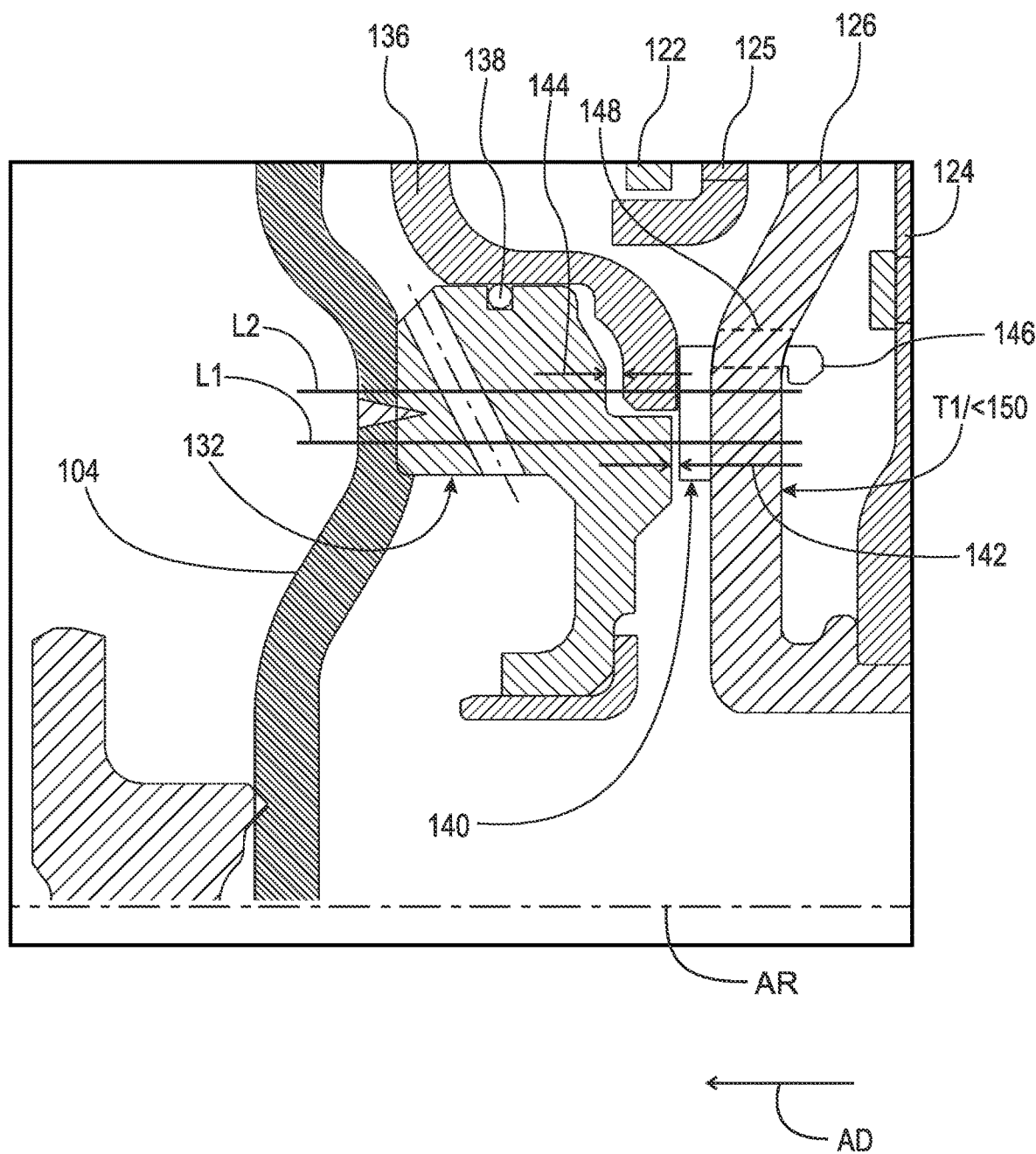
FIG. 2 is a detail of area 2/3 in FIG. 1.

FIG. 2 is a detail of area 2/3 in FIG. 1. The following should be viewed in light of FIGS. 1 and 2. Torque converter 100 includes: hub 132 non-rotatably connected to cover 104; and lock-up clutch 134. Clutch 134 includes axially displaceable piston plate 136, rotatable with respect to hub 132, and clutch plate 137 non-rotatably connected to cover plate 122. Seal 138 is sealed against hub 132 and plate 136.

Torque converter 100 includes washer 140: directly connected to flange 126; axially disposed between hub 132 and flange 126; and axially disposed between piston plate 136 and flange 126. In the liftoff mode: washer 140 and hub 132 are separated by gap 142 in direction AD parallel to axis of rotation AR; and hub 132 and piston plate 136 are separated by gap 144 in direction AD. Straight line L1, parallel to axis of rotation AR, passes through, in sequence, output flange 126, washer 140, and hub 132. Straight line 12, parallel to axis of rotation AR, passes through, in sequence, output flange 126, washer 140, piston plate 136, and hub 132. In the example of FIG. 1, washer 140 is non-rotatably connected to flange 126. For example, protrusion 146 of washer 140 is disposed in opening 148 of flange 126.

By one component "directly connected to" another component, we mean that the components are in direct contact, or that the components are each in direct contact with one or more ancillary intermediate parts, for example, a cap fixed to an end of a spring, such that the components and the ancillary parts are mechanically solid at the points of contact with the one or more ancillary intermediate parts. For example, a washer or coating could be disposed between the two components.

As is known in the art, during operation of torque converter 100 in response to rotational torque RT applied to cover 104, impeller 106 and turbine 108 rotate to generate thrust T1, in direction AD. Thrust T1 displaces turbine shell 116, cover plates 122 and 124, and output flange 126 in direction AD. For a magnitude of thrust T1 less than threshold value 148, flange 126, via washer 140, displaces piston plate 136 in direction AD, while maintaining gap 142. Thrust T1 is transmitted to piston plate 136 via washer 140.

Figure 3:
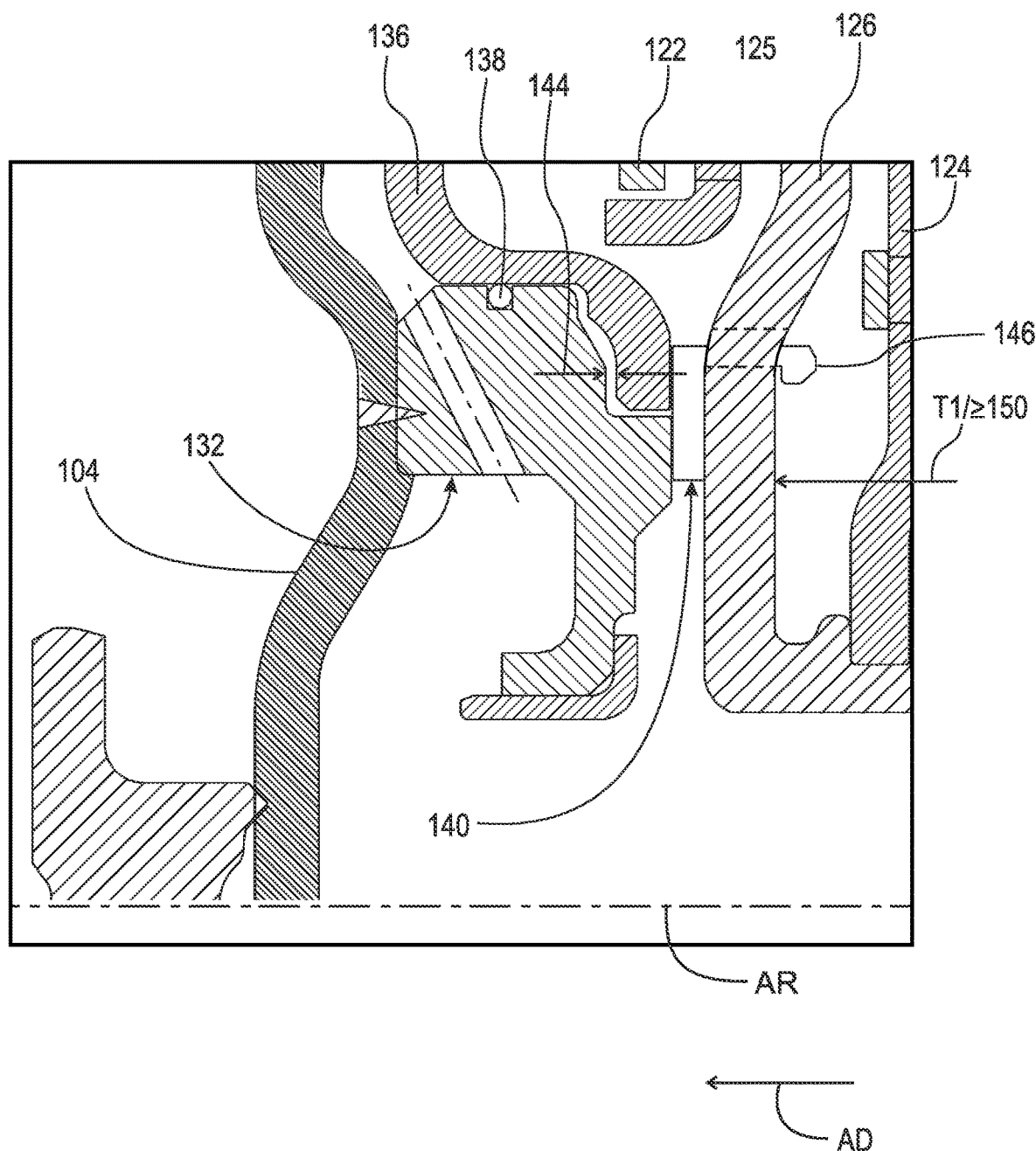
FIG. 3 is a detail of area 2/3 in FIG. 1 with the example torque converter in a loaded state.

FIG. 3 is a detail of area 2/3 in FIG. 1 with torque converter 100 in a loaded stated. The following should be viewed in light of FIGS. 1 through 3. In FIG. 3, thrust T1 is greater than or equal to threshold value 148. As a result: output flange 126 and washer 140 have displaced further in direction AD; washer 140 has contacted hub 132 to close gap 142; and gap 144 is reduced. Thrust T1 is transmitted to piston plate 136 and hub 132 via washer 140.

Figure 4:
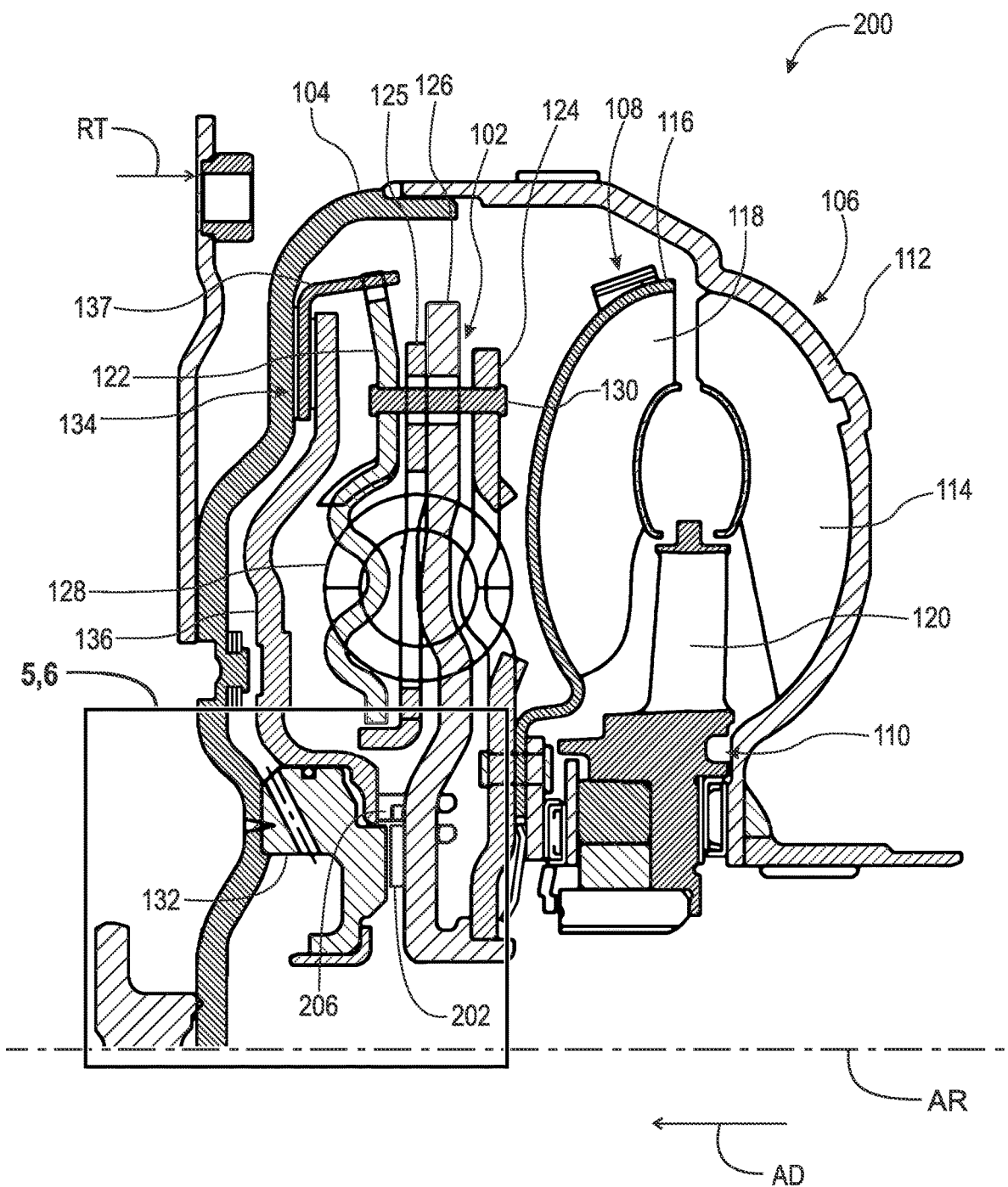
FIG. 4 is a partial cross-sectional view of an example torque converter with balanced turbine thrust loading, in a liftoff mode.

FIG. 4 is a partial cross-sectional view of example torque converter 200 with balanced turbine thrust loading, in a liftoff mode. Torque converter 200 includes: vibration damper 102; cover 104; impeller 106; turbine 108; and stator 110. Impeller 106 includes impeller shell 112 connected to cover 104, and at least one impeller blade 114. Turbine 108 is in fluid communication with impeller 106 and includes turbine shell 116, and at least one turbine blade 118. Stator 110 includes at least one stator blade 120 axially disposed between turbine 108 and impeller 106. Damper 102 includes cover plate 122, cover plate 124, intermediate flange 125, and output flange 126, and spring 128 engaged with cover plate 122, cover plate 124, intermediate flange 125, and output flange 126. Cover plates 122 and 124 are non-rotatably connected by fastener 130. Fastener 130 passes through flanges 125 and 126. Cover plate 124 is non-rotatably connected to turbine shell 116.

Figure 5:
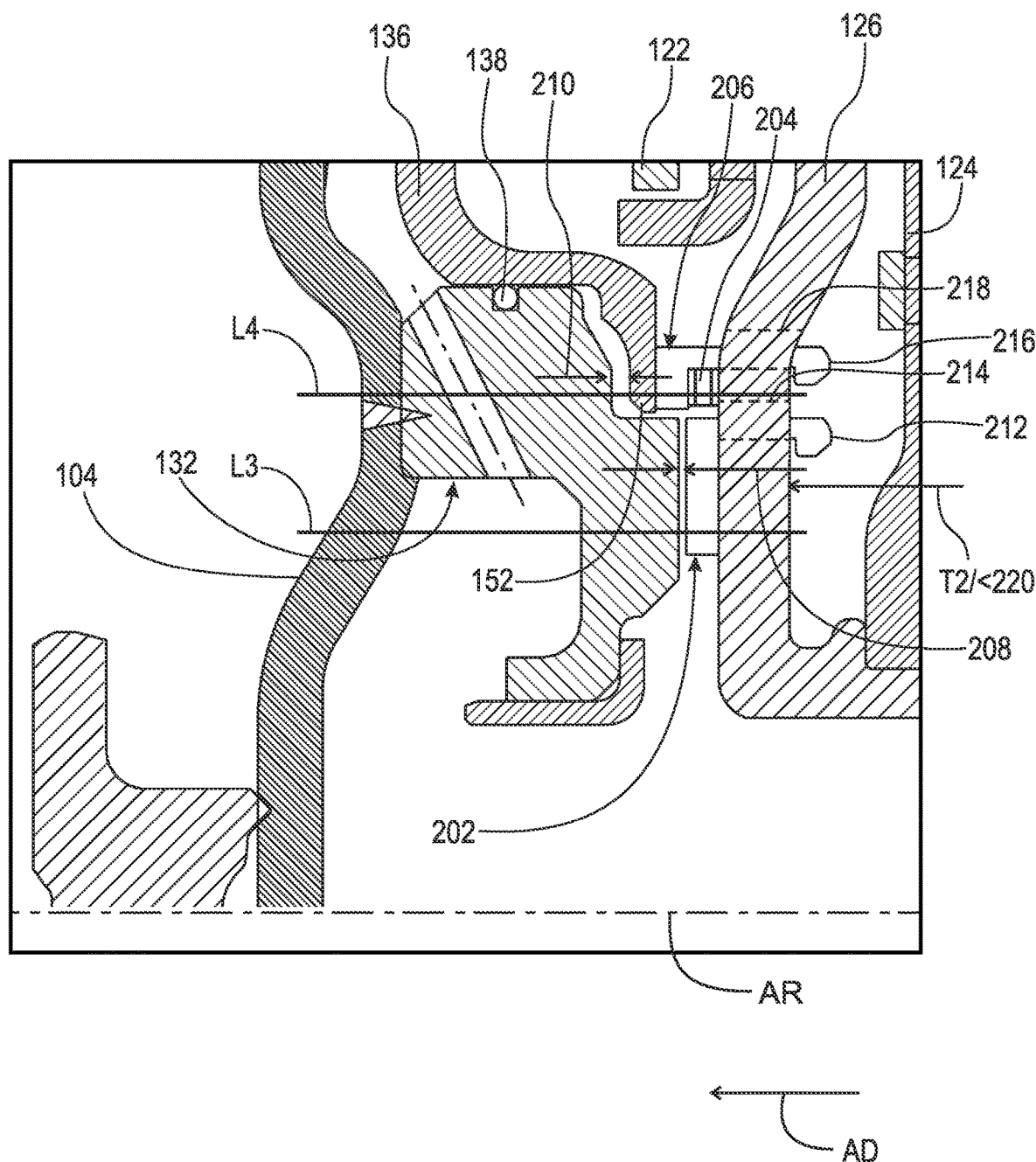
FIG. 5 is a detail of area 5/6 in FIG. 4.

FIG. 5 is a detail of area 5/6 in FIG. 4. The following should be viewed in light of FIGS. 4 and 5. Torque converter 200 includes: hub 132 non-rotatably connected to cover 104; and lock-up clutch 134. Clutch 134 includes axially displaceable piston plate 136, rotatable with respect to hub 132, and clutch plate 137 non-rotatably connected to cover plate 122. Seal 138 is sealed against hub 132 and plate 136.

Torque converter 200 includes: washer 202 directly connected to flange 126 and axially disposed between hub 132 and flange 126; resilient element 204 directly connected to flange 126; and washer 206 directly connected to resilient element 204, axially disposed between element 204 and piston plate 136, and in contact with piston plate 136. Resilient element 204 urges washer 206 in direction AD. In the liftoff mode: washer 202 and hub 132 are separated by gap 208 in direction AD; and hub 132 and distal end 152 of piston plate 136 are separated by gap 210 in direction AD. Straight line U, parallel to axis of rotation AR, passes through, in sequence, output flange 126, washer 202, and hub 132. Straight line L4, parallel to axis of rotation AR, passes through, in sequence, output flange 126, resilient element 204, washer 206, piston plate 136, and hub 132.

In the example of FIG. 4: washer 202 is non-rotatably connected to output flange 126; resilient element 204 is non-rotatably connected to output flange 126; and washer 206 is non-rotatably connected to element 204. For example: protrusion 212 of washer 202 is disposed in opening 214 of flange 126; and protrusion 216 of washer 206 is disposed in opening 218 of flange 126.

As is known in the art, during operation of torque converter 200 in response to rotational torque RT applied to cover 104, impeller 106 and turbine 108 rotate to generate thrust T2, in direction AD. Thrust T2 displaces turbine shell 116, cover plates 122 and 124, and output flange 126 in direction AD. For a magnitude of thrust T2 less than threshold value 220: element 206 is not compressed by flange 126 or is only partially compressed by flange 126; thrust T2 is transmitted to plate 136 via washer 206; and gaps 208 and 210 are maintained.

Figure 6:
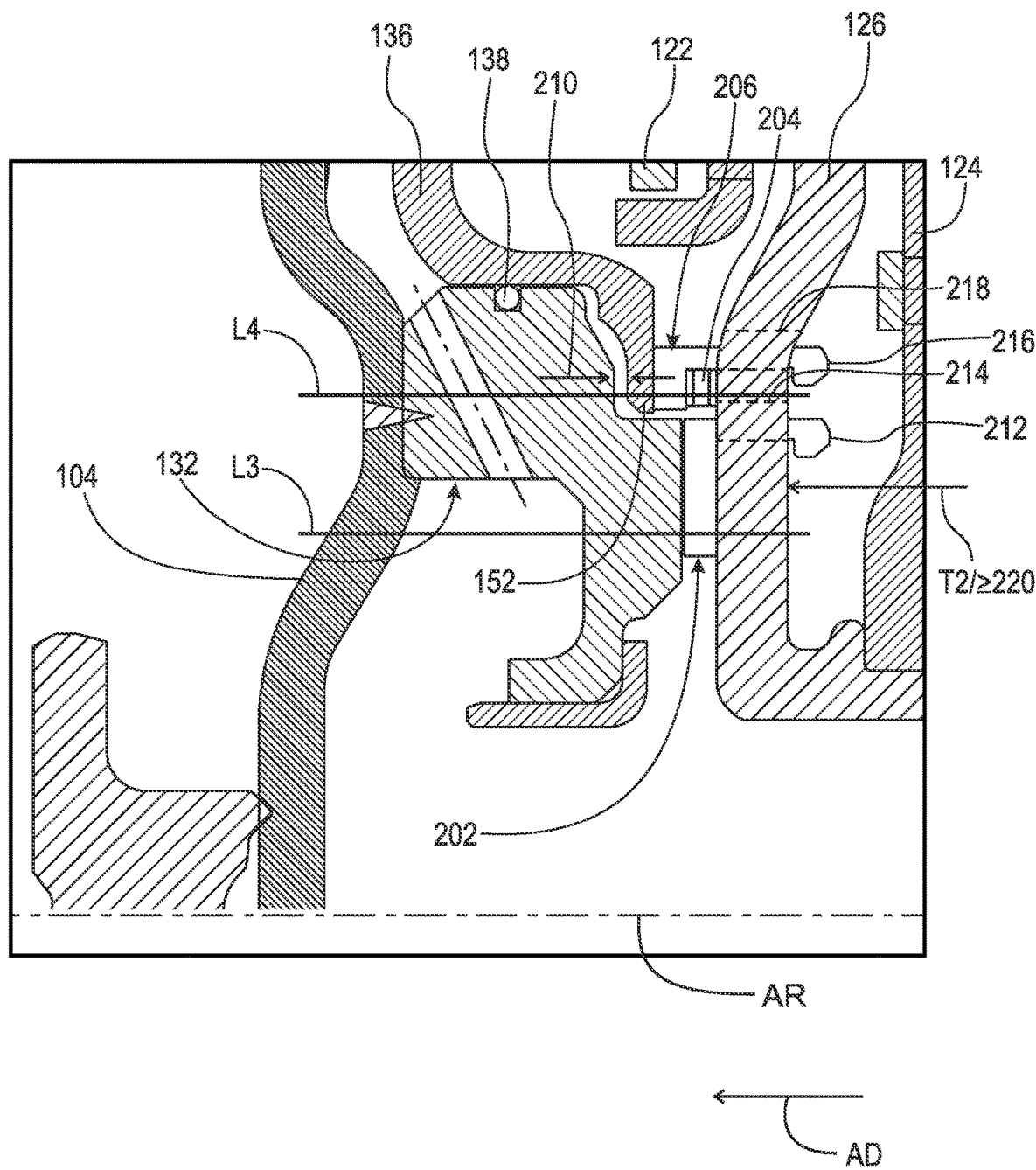
FIG. 6 is a detail of area 5/6 in FIG. 4 with the example torque converter in a loaded state.

FIG. 6 is a detail of area 5/6 in FIG. 4 with torque converter 200 in a loaded state. The following should be viewed in light of FIGS. 4 through 6. For a magnitude of thrust T2 greater than or equal to threshold value 220: flange 126 displaces further in direction AD; flange 126 compresses element 204; washer 202 contacts hub 132; gap 208 is closed; and gap 210 is reduced. Thrust T2 is transmitted to hub 132 and piston plate 136 via washer 202 and washer 206, respectively.

The following should be viewed in light of FIGS. 1 through 3. The following describes a method for operating a torque converter. Although the method is presented as a sequence of steps for clarity, no order should be inferred from the sequence unless explicitly stated. The torque converter includes: a cover arranged to receive torque and supported for rotation around an axis of rotation; an impeller; a turbine in fluid communication with the impeller; a stator including at least one stator blade axially disposed between the turbine and the impeller; a vibration damper including a cover plate, an output flange arranged to non-rotatably connect to an input shaft of a transmission, and a spring engaged with the cover plate and the output flange; a hub non-rotatably connected to the cover; a lock-up clutch including a piston plate; and a washer in contact with the piston plate, directly connected to the output flange, and axially disposed between the hub and the output flange. In a liftoff mode of the torque converter, the washer is separated from the hub by a gap in an axial direction parallel to the axis of rotation.

A first step applies a rotational torque to the cover. A second step rotates the cover and the turbine. A third step generates, with the turbine, a thrust in an axial direction. A fourth step displaces, with the turbine, the cover plate, the washer, the output flange, and the piston plate in the axial direction while maintaining the gap. A fifth step transmits, via the washer, the thrust to the piston plate. A sixth step: increases the thrust; and further displaces, with the turbine, the cover plate, the output flange, the washer, and the piston plate in the axial direction. A seventh step contacts the hub with the washer. An eighth step transmits, via the washer, the thrust to the piston plate and the hub.

The following should be viewed in light of FIGS. 4 through 6. The following describes a method for operating a torque converter. Although the method is presented as a sequence of steps for clarity, no order should be inferred from the sequence unless explicitly stated. The torque converter includes: a cover arranged to receive torque and supported for rotation around an axis of rotation; an impeller; a turbine in fluid communication with the impeller; a stator including at least one stator blade axially disposed between the turbine and the impeller; a vibration damper including a cover plate; an output flange arranged to non-rotatably connect to an input shaft of a transmission; and a spring engaged with the cover plate and the output flange; a hub non-rotatably connected to the cover; a lock-up clutch including a piston plate; a first washer directly connected to the output flange, and axially disposed between the hub and the output flange; a second washer in contact with the piston plate; and a resilient element directly connect to the second washer and the output flange and urging the second washer in an axial direction, parallel to the axis of rotation, and into contact with the piston plate. In a liftoff mode of the torque converter: the first washer is separated, in the axial direction, from the hub by a first gap; and the distal end of the piston plate is separated from the hub by a second gap.

A first step applies rotational torque to the cover. A second step rotates the cover and the turbine. A third step generates, with the turbine, a thrust in the axial direction. A fourth step: displaces, with the turbine, the cover plate, the output flange, the resilient element, the first washer, the second washer, and the piston plate in the axial direction. A fifth step maintains the first gap and the second gap. A sixth step transmits, via washer 206, the thrust to the piston plate. A seventh step increases the thrust. An eighth step further displaces, with the turbine, the cover plate, the output flange, the resilient element, the first washer, the second washer, and the piston plate in the axial direction. A ninth step contacts the hub with the first washer; closes the first gap; and reduces the second gap. A tenth step transmits the thrust to the hub and the piston plate via washer 202 and washer 206, respectively.

Torque converters 100 and 200 enable thrust loads T1 and T2 from turbine 108 to be balanced. For example, during the initial stages of the thrust loading (liftoff mode) of torque converters 100 and 200, thrust T1 and T2 are transmitted, via washers 140 and 206, respectively, only to piston plate 136, which assists the axial displacement of piston plate 136 to initiate the closing of lock-up clutch 134 and the transition to a lock-up mode of torque converters 100 and 200. In the lock-up mode, rotational torque RT is transmitted from cover 104 to vibration damper 102 vial lock-up clutch 134. As the thrust load increases, washers 140 and 202 contact hub 132, and thrust T1 and T2 are also transmitted, washers 140 and 202, respectively, to hub 132, which caps the magnitude of thrust T1 and T2 transmitted to piston plate 136, enabling a useful slip of lock-up clutch 134 during a coast condition of torque converters 100 and 200.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD axial direction
AR axis of rotation
L1 straight line
L2 straight line
L3 straight line
L4 straight line
RT rotational torque
T1 thrust
T2 thrust
100 torque converter
102 vibration damper
104 cover
106 Impeller
108 turbine
110 stator
112 impeller shell
114 impeller blade
116 turbine shell
118 turbine blade
120 stator blade
122 cover plate
124 cover plate
125 intermediate flange
126 output flange
128 spring
130 fastener
132 hub
134 lock-up clutch
136 piston plate
137 clutch plate
138 seal
140 washer
142 gap
144 gap
146 protrusion, washer
148 opening, output flange
150 threshold value
152 distal end, piston plate
200 torque converter
202 washer 204 resilient element
206 washer
208 gap
210 gap
212 protrusion
214 opening
216 protrusion
218 opening
220 threshold value
222 threshold value

The invention claimed is:

1. A torque converter, comprising:
a cover arranged to receive torque and supported for rotation around an axis of rotation;
an impeller;
a turbine in fluid communication with the impeller;
a stator including at least one stator blade axially disposed between the turbine and the impeller;
a vibration damper including:
a cover plate;
an output flange arranged to non-rotatably connect to an input shaft of a transmission; and,
a spring engaged with the cover plate and the output flange;
a hub non-rotatably connected to the cover;
a lock-up clutch including a piston plate; and,
a first washer directly connected to the output flange, axially disposed between the hub and the output flange, and separated, in an axial direction parallel to the axis of rotation, from the hub by a first gap, wherein a straight line, parallel to the axis of rotation, passes through, in sequence, the output flange, the first washer, and the hub.

2. The torque converter of claim 1, wherein during operation of the torque converter:
the turbine is arranged to displace the cover plate and the output flange in the axial direction; and,
the output flange is arranged to displace, with the first washer, the piston plate in the axial direction while maintaining the first gap.

3. The torque converter of claim 1, wherein during operation of the torque converter:
the turbine is arranged to displace the cover plate and the output flange in the axial direction; and,
the output flange is arranged to displace the first washer into contact with the hub.

4. The torque converter of claim 1, wherein the first washer is in contact with the piston plate.

5. The torque converter of claim 1, further comprising:
a second washer axially disposed between the piston plate and the output flange, wherein a straight line, parallel to the axis of rotation, passes through, in sequence, the output flange, the second washer, and the piston plate.

6. The torque converter of claim 5, wherein:
the hub is separated, in the axial direction, from the piston plate by a second gap; and,
during operation of the torque converter:
the turbine is arranged to displace the cover plate and the output flange in the axial direction; and,
the output flange is arranged to displace, in the axial direction, the first washer into contact with the hub, while maintaining the second gap between the hub and the piston plate.

7. The torque converter of claim 5, wherein during operation of the torque converter:
the turbine is arranged to displace the cover plate and the output flange in the axial direction; and,
the output flange is arranged to displace, with the second washer and in the axial direction, the piston plate while maintaining the first gap between the output flange and the first washer.

8. The torque converter of claim 5, wherein during operation of the torque converter:
the turbine is arranged to displace the cover plate and the output flange in the axial direction; and,
the output flange is arranged to in sequence:
displace, with the second washer, the piston plate in the axial direction; and,
displace the first washer into contact with the hub.

9. The torque converter of claim 5, further comprising:
a resilient element axially disposed between the second washer and the output flange and in contact with the second washer and the output flange.

10. The torque converter of claim 9, wherein during operation of the torque converter:
the turbine is arranged to displace the cover plate and the output flange in the axial direction; and,
the output flange is arranged to compress the resilient element while maintaining the first gap between the output flange and the first washer; or,
the output flange is arranged to displace, with the resilient element and the second washer, the piston plate in the axial direction.

11. The torque converter of claim 9, wherein during operation of the torque converter:
the turbine is arranged to displace the cover plate and the output flange in the axial direction;
the output flange is arranged to compress the resilient element; and,
the output flange is arranged to displace, with the resilient element and the second washer, the piston plate in the axial direction.

12. The torque converter of claim 9, wherein during operation of the torque converter:
the turbine is arranged to displace the cover plate and the output flange in the axial direction;
the output flange is arranged to compress the resilient element;
the output flange is arranged to, with the resilient element and the second washer, displace the piston plate in the axial direction; and,
the output flange is arranged to displace the first washer into contact with the hub.

13. The torque converter of claim 1, further comprising:
a second washer axially disposed between the piston plate and the output flange and in contact with the piston plate.

14. A torque converter, comprising:
a cover arranged to receive torque and supported for rotation around an axis of rotation;
an impeller;
a turbine in fluid communication with the impeller;
a stator including at least one stator blade axially disposed between the turbine and the impeller;
a vibration damper including:
a cover plate;
an output flange arranged to non-rotatably connect to an input shaft of a transmission; and,
a spring engaged with the cover plate and the output flange;
a hub non-rotatably connected to the cover;
a lock-up clutch including a piston plate; and,
a washer:
in contact with the piston plate;

directly connected to the output flange;
axially disposed between the hub and the output flange; and,
separated from the hub by a gap in an axial direction parallel to the axis of rotation, wherein a straight line, parallel to the axis of rotation, passes through, in sequence, the output flange, the washer, and the hub.

15. The torque converter of claim 14, wherein during operation of the torque converter:
the turbine is arranged to displace the cover plate and the output flange in the axial direction; and,
the output flange is arranged to:
displace, with the washer, the piston plate in the axial direction, and displace the washer into contact with the hub; or,
displace, with the washer, the piston plate in the axial direction while maintaining the gap.

16. A torque converter, comprising:
a cover arranged to receive torque and supported for rotation around an axis of rotation;
an impeller;
a turbine in fluid communication with the impeller;
a stator including at least one stator blade axially disposed between the turbine and the impeller;
a vibration damper including:
a cover plate;
an output flange arranged to non-rotatably connect to an input shaft of a transmission; and,
a spring engaged with the cover plate and the output flange;
a hub non-rotatably connected to the cover;
a lock-up clutch including a piston plate;
a first washer directly connected to the output flange, axially disposed between the hub and the output flange, and separated, in an axial direction parallel to the axis of rotation, from the hub by a first gap;
a second washer axially disposed between the piston plate and the output flange; and,
a resilient element directly connect to the second washer and the output flange, wherein:
a first straight line, parallel to the axis of rotation, passes through, in sequence, the output flange, the first washer, and the hub; and,
a second straight line, parallel to the axis of rotation, passes through, in sequence, the output flange, the resilient element, the second washer, and the piston plate.

17. The torque converter of claim 16, wherein:
the hub is separated, in the axial direction, from the piston plate by a second gap; and,
during operation of the torque converter:
the turbine is arranged to displace the cover plate and the output flange in the axial direction; and,
the output flange is arranged to displace, in the axial direction, the first washer into contact with the hub, while maintaining the second gap between the hub and the piston plate.

18. The torque converter of claim 16, wherein during operation of the torque converter:
the turbine is arranged to displace the cover plate and the output flange in the axial direction; and,
the output flange is arranged to displace, with the second washer, the piston plate in the axial direction, while maintaining the first gap.

19. The torque converter of claim 16, wherein during operation of the torque converter:
the turbine is arranged to displace the cover plate and the output flange in the axial direction;
the output flange is arranged to compress the resilient element against the second washer; and,
the output flange is arranged to displace, with the second washer, the piston plate in the axial direction, while maintaining the first gap.

20. The torque converter of claim 16, wherein during operation of the torque converter:
the turbine is arranged to displace the cover plate and the output flange in the axial direction; and,
the output flange is arranged to:
compress the resilient element against the second washer;
displace, with the second washer, the piston plate in the axial direction; and,
contact the hub with the first washer.

* * * * *